(12) United States Patent
Tucker et al.

(10) Patent No.: US 8,284,387 B2
(45) Date of Patent: Oct. 9, 2012

(54) METHODS AND SYSTEMS FOR RECOGNIZING TAMPER EVENTS

(75) Inventors: James L. Tucker, Clearwater, FL (US);
Kara L. Warrensford, Tampa, FL (US);
William J. Dalzell, Parrish, FL (US);
Scott G. Fleischman, Palmetto, FL (US)

(73) Assignee: Honeywell International Inc., Morristown, NJ (US)

( * ) Notice: Subject to any disclaimer, the term of this patent is extended or adjusted under 35 U.S.C. 154(b) by 1286 days.

(21) Appl. No.: 11/672,642

(22) Filed: Feb. 8, 2007

(65) Prior Publication Data

US 2008/0192240 A1    Aug. 14, 2008

(51) Int. Cl.
*G01N 21/00* (2006.01)

(52) U.S. Cl. .......................................... 356/73.1

(58) Field of Classification Search ............ None
See application file for complete search history.

(56) References Cited

U.S. PATENT DOCUMENTS

| | | | |
|---|---|---|---|
| 4,161,348 A * | 7/1979 | Ulrich ........................... 385/115 |
| 4,447,123 A | 5/1984 | Page et al. |
| 4,523,186 A | 6/1985 | Fiarman |
| 5,026,141 A | 6/1991 | Griffiths |
| 5,049,855 A * | 9/1991 | Slemon et al. ................. 340/550 |
| 5,117,457 A | 5/1992 | Comerford et al. |
| 5,142,141 A * | 8/1992 | Talat et al. ............... 250/227.15 |
| 5,177,352 A * | 1/1993 | Carson et al. ................. 250/221 |
| 5,283,431 A * | 2/1994 | Rhine ........................... 250/229 |
| 5,468,990 A | 11/1995 | Daum |
| 5,506,566 A | 4/1996 | Oldfield et al. |
| 5,568,124 A | 10/1996 | Joyce et al. |
| 5,675,319 A | 10/1997 | Rivenberg et al. |
| 5,677,769 A | 10/1997 | Bendett |
| 5,821,582 A | 10/1998 | Daum |
| 6,215,397 B1 | 4/2001 | Lindskog |
| 6,396,400 B1 | 5/2002 | Epstein, III et al. |
| 6,400,268 B1 | 6/2002 | Lindskog |
| 6,692,031 B2 | 2/2004 | McGrew |
| 6,838,619 B1 | 1/2005 | Soyfertis |
| 6,853,093 B2 | 2/2005 | Cohen et al. |
| 6,970,360 B2 | 11/2005 | Sinha |
| 7,005,733 B2 | 2/2006 | Kommerling et al. |
| 7,015,823 B1 | 3/2006 | Gillen et al. |
| 7,021,146 B2 | 4/2006 | Nash et al. |
| 7,030,974 B2 | 4/2006 | Spirin et al. |
| 7,045,730 B2 | 5/2006 | Hollar et al. |
| 2001/0033012 A1 | 10/2001 | Kommerling et al. |
| 2001/0056542 A1 | 12/2001 | Cesana et al. |
| 2002/0191788 A1 | 12/2002 | Inchalik et al. |
| 2002/0199111 A1 | 12/2002 | Clark et al. |
| 2003/0014643 A1 | 1/2003 | Asami et al. |

(Continued)

FOREIGN PATENT DOCUMENTS

DE        10065747        12/2000

(Continued)

*Primary Examiner* — Tu Nguyen
(74) *Attorney, Agent, or Firm* — Shumaker & Sieffert, P.A.

(57) ABSTRACT

A method of recognizing a tamper event is provided. The method uses an optical medium having a unique signature, and transmits at least one light wave into the optical medium. The light wave is altered by the unique signature of the optical medium and at least one property of the light wave is measured. Access to at least a portion of a system is conditioned based on the at least one property of the light wave.

19 Claims, 5 Drawing Sheets

U.S. PATENT DOCUMENTS

2006/0267763 A1 * 11/2006 Rao ............................... 340/541

FOREIGN PATENT DOCUMENTS

| EP | 0142013 | 5/1985 |
|---|---|---|
| EP | 0509567 | 10/1992 |
| EP | 0972632 | 1/2000 |
| EP | 1045352 | 10/2000 |
| EP | 1273997 | 1/2003 |
| WO | 9502742 | 1/1995 |
| WO | 9738364 | 10/1997 |
| WO | 0123980 | 4/2001 |

* cited by examiner

METHODS AND SYSTEMS FOR RECOGNIZING TAMPER EVENTS

BACKGROUND

Military and commercial technologies such as electronic systems often include proprietary circuit designs and source codes. This electronic proprietary information needs protection from reverse engineering and tampering. If not protected, sensitive information can fall into the hands of unwanted individuals. If such technology belongs to a commercial entity, the information obtained by a reverse engineer could cause financial losses and undermine the economic security of that entity. The stakes are even higher when the proprietary information belongs to the military. The information obtained by a reverse engineer may endanger national security, or enable enemies to operate advanced weaponry. Furthermore, the military is often unaware of this type of leak, until the information is used against them. Confidence in the integrity of proprietary information is essential. Additionally, if reverse engineers can inspect and understand the technology, they may be able to develop a way to overcome the technology, thus rendering it useless.

Traditional anti-tampering mechanisms place electronic sensors throughout a device to detect when an intruder is attempting to access information from the device. When a tamper event is detected by the sensors, the sensors send a signal notifying the event to a main processor. The main processor reacts to the event to prevent the intruder from obtaining any of the proprietary information or technology. Since these traditional sensors are continually monitoring for a tamper event, they require a continuous flow of electricity. Traditional sensors, therefore, must be connected to a landline power supply, a generator, or a battery. If no power is flowing to the sensors, they will not acknowledge any tamper events.

The dependence of powered sensors upon electricity may render them impractical in certain situations. For example, proprietary technology may have storage requirements for 20 or more years in inaccessible locations. Time spans of this duration are outside of the operational lifetime of a typical battery. Additionally, long time spans that are within the operational lifetime of a battery can be impractical because of the significant weight and volume of battery power required. Thus, constrained by battery size and shelf life, usage of batteries to power sensors requires periodically access to systems for battery replacement and maintenance. Accessing the system is no trivial task. The battery powered component could be assembled as part of a larger system that could incur high labor costs to dismantle for servicing. Also, in some types of enclosures checking the battery could require breaking the protective seals of the system, resulting in the detection of a tamper event. This, in turn, may cause the subsequent activation of the anti-tamper protocol, which may destroy the proprietary information. For these reasons, batteries are not favored in long term storage applications. Another option is to hardwire the system to a generator or a landline power supply. This solution also has drawbacks, mostly related to cost and practicality.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. In one embodiment, a method of recognizing a tamper event is disclosed. The method uses an optical medium having a unique signature, and transmits at least one light wave into the optical medium. The light wave is altered by the unique signature of the optical medium and at least one property of the light wave is measured. Access to at least a portion of a system is conditioned based on the at least one property of the light wave.

BRIEF DESCRIPTION OF THE DRAWINGS

The present invention can be more easily understood, and further advantages and uses thereof are more readily apparent, when considered in view of the detailed description and the following figures in which.

In accordance with common practice, the various described features are not drawn to scale but are drawn to emphasize specific features relevant to the present invention. Like reference characters denote like elements throughout the Figures and text.

DETAILED DESCRIPTION

In the following detailed description, reference is made to the accompanying drawings that form a part hereof, and in which is shown by way of illustration specific illustrative embodiments in which the method and system may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

The present methods and systems recognize a tamper event with or without power. This is accomplished by using an optical medium as a tamper event sensor. The optical medium is formed into a unique shape and the apparatus to be protected is encapsulated by the optical medium. Inherent optical properties of the optical medium change as the shape and construction of the optical medium changes. These properties are used to characterize the shape of optical medium. The optical medium is placed in its final position and is characterized. If any alteration or damage to optical medium occurs, the characteristics will be altered.

This alteration of characteristics is used to determine if the apparatus has been accessed. An intruder who attempts to access the protected technology will move or break the encapsulating optical medium and irreparably change its characteristics. The apparatus recognizes the altered characteristics of the optical medium and prevents the proprietary information from being obtained. Since the tamper event is 'recorded' by the altered optical medium, power is not needed at the time of tampering. To protect the proprietary information, for example, when power is reapplied to the system by the reverse engineer, the system will automatically recognize the tamper event, because of the altered optical medium. Further, since the characteristics of the optical medium are specific to its unique shape and size, the optical medium cannot be generically replaced or easily duplicated. Thus, the system cannot be spoofed, so once the tamper event has occurred, the apparatus can no longer be used. The system could be used in a commercial application (e.g. a gaming system) or by a military system to recognize a reverse engineering attack, or other unauthorized access which occurred while the system was without power. Further detail regarding the present methods and systems are provided hereafter with reference to FIGS. 1-8.

Figure 1:
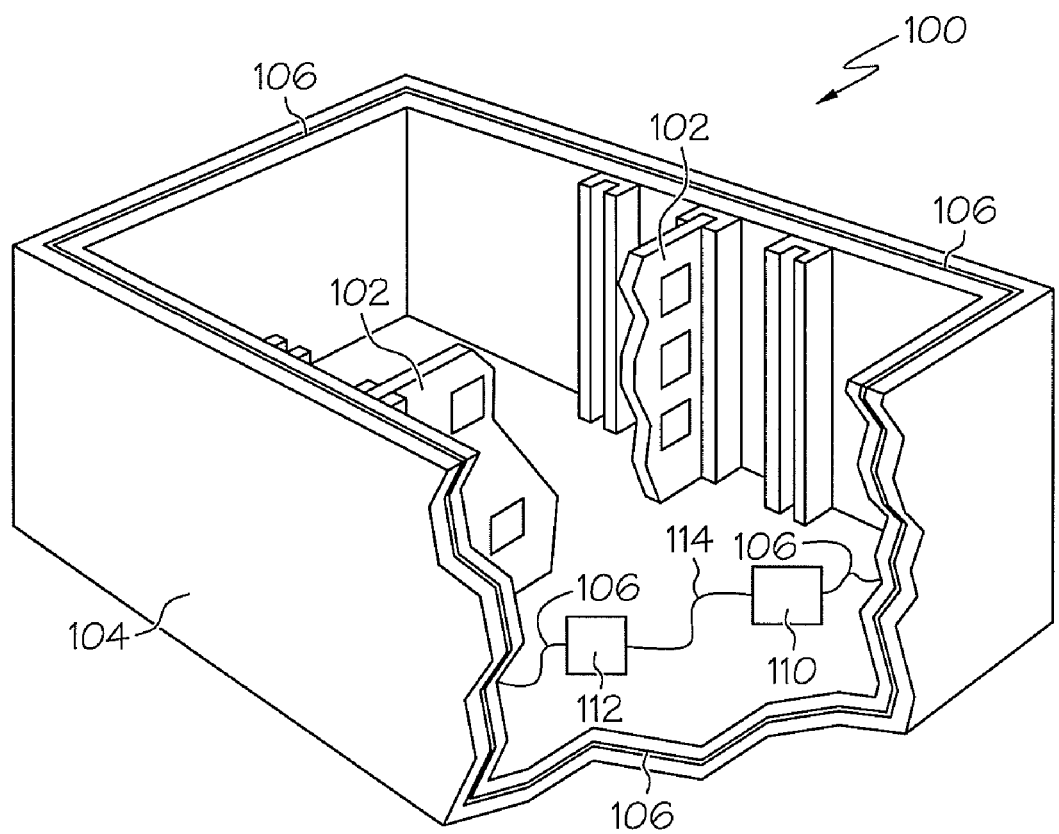
FIG. 1 is perspective view of one embodiment of a system for recognizing tamper events.
Figure 2:
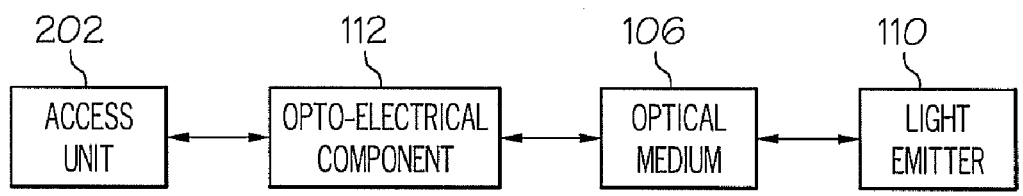
FIG. 2 is a block diagram of one embodiment of the system of FIG. 1.

FIG. 1 shows a perspective view of one embodiment of a system 100 capable of recognizing a tamper event without power. System 100 includes a protected component 102, a capsule 104, and an optical medium 106. In one embodiment, protected component 102 is a mechanical system or a hardware circuit. In another embodiment, protected component 102 is a memory device which contains sensitive software or electronic information. Capsule 104 is container that surrounds protected component 102 and prevents access to protected component 102 by the outside world. As shown in FIG. 1, optical medium 106 is disposed between layers of capsule 104. Optical medium 106 is coupled on one end to an opto-electrical component 112 via wire 108. In one embodiment, optical medium 106 is coupled on the other end to a light emitter 110 via wire 109. In another embodiment, time domain reflectometry is used and light emitter 110 is coupled to the same end of optical medium 106 as opto-electrical component 112. Light emitter 110, optical opto-electrical component 112, and time domain reflectometry will be explained in further detail below.

Capsule 104 provides a solid structure upon which optical medium 106 is mounted. In one embodiment, optical medium 106 is disposed throughout the entire area of capsule 104. Thus, optical medium 106 completely surrounds protected component 102, so that if capsule 104 is removed, cut, or otherwise tampered with optical medium 106 will be altered. Consequently, optical medium 106 will be moved or broken if an intruder attempts to access the inside of capsule 104. Alternatively, optical medium 106 can be placed in any manner to condition access to protected component 102.

Optical medium 106 is a material capable of controlling the path of a light wave, and can therefore, alter the properties of the light wave. The type and amount of alteration of the light wave properties changes based on the characteristics of the path. The path characteristics are a function of the physical attributes of optical medium 106, including the shape of the signal path, the length of the signal path, and the refractive index. These characteristics impact light wave properties such as, propagation delay, signal loss, polarization, wavelength, and phase. Light wave properties, refer to characteristics of the light wave itself, such as those listed above, and not merely the location of the light wave in space. Properties of the light wave are used to characterize optical medium 106, because it is difficult to ascertain precisely how the characteristics of optical medium 106 will affect a light wave traveling through optical medium 106 without transmitting a light wave through optical medium 106 and measuring the light wave properties directly. In contrast, prior art systems have determined, for example, the location or exit point of a light signal traveling through a bundle of optical fibers. This is susceptible to reverse engineering, because an exit point of a light signal can be ascertained through outward examination of the system.

In one embodiment, a single light wave is transmitted through optical medium 106. In another embodiment, multiple light waves are transmitted through optical medium 106. In yet another embodiment, multiple light waves are optically modulated or pulsed, and a light signal is transmitted through optical medium 106.

The characteristics of optical medium 106 change with alterations in the shape or design of optical medium 106. Thus, optical medium 106 can be given an unknown and unique "signature" by forming optical medium 106 into a unique shape, and/or unique material. Moreover, even if the shape of optical medium 106 is outwardly observed, the output properties of a light signal traveling through optical medium 106 cannot be predicted. In one embodiment, opto-electrical component 112 and access system 202 (shown in FIG. 2) and the connection between optical medium 112 and opto-electrical component 112 are contained in capsule 104, such that they cannot be accessed without altering optical medium 106. Thus, the characteristics of optical medium 106 cannot be discovered, and if an attempt is made, the characteristics will be irreparably altered.

In one embodiment, optical medium 106 is characterized by observing the ability of optical medium 106 to transmit a light wave. The ability to transmit a light wave is measured, in one embodiment, by the propagation delay of the light signal traveling through optical medium 106. The propagation delay of the signal is the difference in time from when the signal enters optical medium 106 to when the signal exits optical medium 106. In another embodiment, attenuation is used to measure the ability to transmit a light wave. The attenuation of optical medium 106 refers to the power difference between the transmitted light signal and the received light signal. Alternatively, any light wave properties could be used to characterize optical medium 106. The potential alteration in properties of optical medium 106 when optical medium 106 is altered is used to determine if an intruder has attempted to access system 100. In one embodiment, optical medium 106 is chosen to have stable characteristics over a wide temperature range to ensure effective use of the system in varying environments.

To assure that optical medium 106 does not move or change shape during normal operation of system 100, optical medium 106 is permanently fixed in position. Fixing optical medium 106 in position ensures that a consistent output is obtained from optical medium 106 throughout unaltered operation of system 100.

In one embodiment, to characterize optical medium 106, opto-electrical component 112 sends a signal over wire 114 to light emitter 110. When light emitter 110 receives the signal from opto-electrical component 112, light emitter 110 transmits a light wave into one end of optical medium 106. Opto-electrical component 112 receives the light wave at a second end of optical medium 106. In one embodiment, light wave is a laser signal which is transmitted through optical medium 106. Opto-electrical component 112, then characterizes optical medium 106 based on measurements of the light wave that has traveled in optical medium 106.

In one embodiment, opto-electrical component 112 characterizes optical medium 106 by measuring the propagation delay of the light wave through optical medium 106. In another embodiment, opto-electrical component 112 characterizes optical medium 106 by measuring the wave attenuation through optical medium 106. In yet another embodiment, opto-electrical component 112 characterizes optical medium 106 by measuring both propagation delay and attenuation. In still another embodiment, system 100 includes a second optical medium (not shown) coupled to light emitter 110 and opto-electrical component 112. In this embodiment, opto-electrical component 112 characterizes both optical mediums 106, and calculates a differential between the two optical mediums 106. Alternatively, any properties of a light wave could be used to characterize optical medium 106.

Opto-electrical component 112 is precise enough to recognize slight alterations in the properties of a light wave traveling in optical medium 106. Additionally, opto-electrical component 112 is able to obtain consistent results from optical medium 106 when optical medium 112 has not been altered. The precision of opto-electrical component 112 is fine enough to ensure that if optical medium 106 is altered, it is difficult, if not impossible, to reconstruct optical medium 106 to its original characteristics.

In one embodiment, optical medium 106 is used to condition access to a system component by using optical medium as a key that is needed to operate system 100. In this embodiment, system 100 operates from encrypted software and requires a key to decrypt the software and operate system 100. To encrypt the software, the properties of a light wave that has traveled in optical medium 106 are measured in the permanent fixed position of optical medium 106. These properties are then input into a function which transforms the properties into the key used to encrypt the software. Then, to operate the system, the key must be generated to decrypt the software. To generate a key, opto-electrical component 112 first characterizes optical medium 106. The values obtained from the characterization of optical medium 106 are then input into a key generation function. The function transforms the values from optical medium 106 into an encryption key. Thus, the key is effectively stored in optical medium 106 and system 100 relies on the retrieval of the inherent characteristic during subsequent measurements to successfully calculate the decryption code and access the protected information. If, therefore, optical medium 106 is altered, the values and key obtained from optical medium 106 are also altered.

Figure 3:
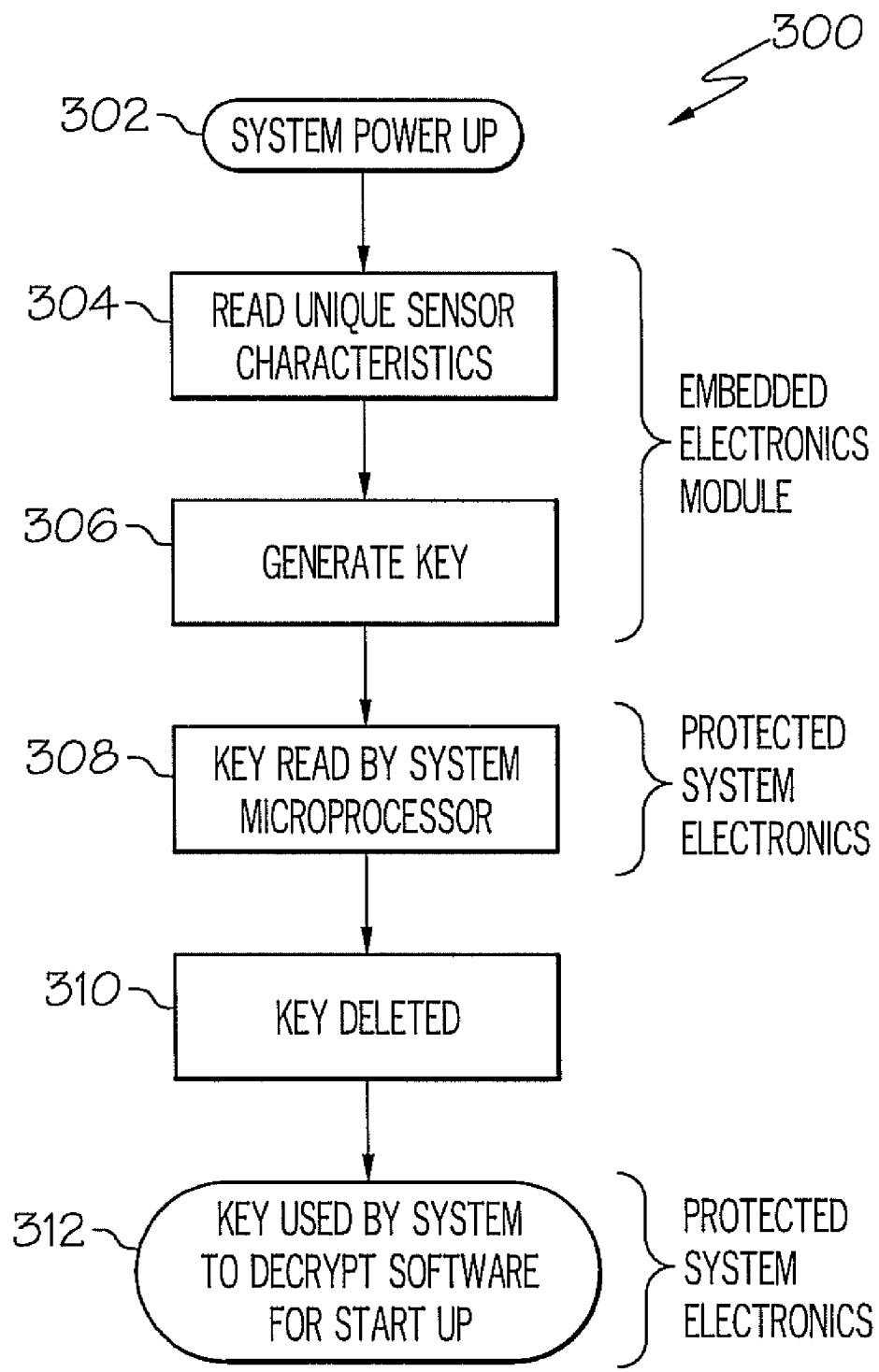
FIG. 3 is a flow diagram of one embodiment of a method of recognizing tamper events using the system of FIG. 1.

FIG. 3 illustrates one embodiment of a method 300 of operation of system 100. In this embodiment, an integrity check is performed by system 100 upon startup. In another embodiment, the integrity check is performed periodically while the system is operating. To perform the integrity check, the system is first powered up (302). Soon after power up the system measures the properties of a light wave that has traveled in optical medium 106 (304). If any tampering occurred while the power was off, the tampering will be 'recorded' by the altered characteristics of optical medium 106. A key is generated from the characteristics obtained from optical medium 106 (306) by access system 202. The key is read by the microprocessor of system 100 (308). In this embodiment, the microprocessor is part of the protected electronics, so the key can be stored in microprocessor, but the key is deleted elsewhere to insure that the key cannot be copied (310). The microprocessor then uses the key to decrypt the operating software for system 100 (312). The characteristics of optical medium 106 are directly translated into a system key. If no tampering has taken place the correct key is generated and the system functions normally.

If an intruder has attempted to access the system, and thus altered optical medium 106, the values received when measuring the characteristics will also be altered. These altered values cause an altered key to be generated. The altered key will prevent system 100 from operating, because system 100 cannot decrypt its operating software. Since even a slight difference in shape of optical medium 106 will alter its characteristics, it is virtually impossible to re-position the optical medium to obtain the original characteristics. Furthermore, the characteristics of optical medium 106 cannot be discovered after installation of optical medium 106. Thus, an intruder who alters optical medium 106 will have permanently destroyed the key to operate system 100.

In another embodiment, system 100 protects encrypted information. In this embodiment, system 100 will operate normally with an altered key, except system 100 will not be able to decrypt the encrypted information. Thus, this embodiment can be used to limit access to protected information within a larger system.

In yet another embodiment, access system 202 enters a tamper event mode upon detection of altered characteristics of optical medium 106. In this embodiment, access system 202 does not generate a key from the characteristics of optical medium. Instead, the values of optical medium are simply verified by access system 202. If altered characteristics are encountered, the tamper event mode is activated. In one embodiment, to eliminate access to protected information, tamper event mode automatically destroys all data on system 100. In another embodiment, tamper event mode limits access by transmitting a communication identifying the tamper event back to headquarters. In yet another embodiment, system 100 self destructs to prevent access.

In still another embodiment, optical medium 106 conditions access to a system component by being constantly powered up and comparing successive measured light wave properties to detect a change in characteristics of optical medium 106. If a change in characteristics is recognized, system 100 will enter a tamper event mode.

In one embodiment, a plurality of identical devices is manufactured with encrypted software. Since the devices are identical the encrypted software on each device requires the same generic key to decrypt the software. A different optical medium is formed for each device. At least one property of a light wave that has traveled in the optical medium for the first device is measured. A unique opto-electrical component and a unique access system are then individually configured to translate the unique properties of the light wave that traveled in the optical medium into the generic key that will decrypt the software. Thus, a generic key can be used to decrypt software within a device, but the key is created from the combination of two unique components. If the input or output of either component is unknown, the key cannot be determined. Since the output of optical medium cannot be outwardly determined, the key cannot be determined.

Another unique optical medium, unique opto-electrical component, and a unique access system are designed for the second device. The opto-electrical component and access system are different than the first ones, because they are configured to translate the output of the second optical medium, which has a unique output, into the generic key. Thus, a device can be mass produced, while still being protected, and the key cannot be discovered. The key cannot be discovered, because it is effectively stored in the optical medium, opto-electrical component, access system combination. Any attempt to access the system will alter the optical medium and thus, destroying the ability to obtain the key.

In one embodiment, optical medium 106 is an optical fiber. The optical fiber is cut to a certain length and bent into a specified shape to give the optical fiber at least one unique characteristic. Since the length and shape are selected to be unique, they are not generically replaceable and not easily to duplicate. A light signal sent through one end of the fiber will have a unique light propagation delay and signal attenuation at the other end of the fiber. Alternatively, other changes to the fiber can be made to form unique characteristics. In one embodiment, the length of the fiber can be altered, the pattern and number of bends of the fiber can be modified, or the fiber can be crimped, cut, or spliced. All of these changes affect the characteristics of the fiber. In another embodiment, foreign materials are imbedded into the optical medium. In yet another embodiment, a number of fibers of differing optical quality are spliced together. Alternatively, any combination of shape alteration, embedded materials, and multiple fiber optics could be used. Thus, each optical fiber can be formed such that the optical fiber is unique. Also, any alteration of the optical medium will irreparably alter the characteristics. Thus, a tamper event can be detected even if the fiber optic is "jumpered", fusion bonded together after being damaged, or otherwise optically spliced together.

In another embodiment, optical medium 106 is a panel of optical material that is etched with reflective coefficients or prisms. The reflective coefficients create a light path through the panel with unique characteristics, similar to those of an optical fiber. The panel is placed over the protected electronics so that the electronics cannot be accessed without altering or damaging the panel. In yet another embodiment, optical medium 106 is formed from one or more optical thin films, or other refractive material.

In yet another embodiment, system 100 is composed of multiple optical mediums 106. For example, each optical medium can be an optical fiber. In addition to the individual characteristics of each fiber, a differential between the two or more fibers can be used to verify the integrity of system 100. In this embodiment, a signal is sent down each optical fiber. The propagation delay or the signal attenuation of each is measured. Then, the propagation delays or signal attenuations of each fiber are compared to obtain a differential between two or more fibers.

In another embodiment, optical medium 106 is connected to a part which, if removed, identifies improper access to a secure area, or which, if removed, should disable the device. For example, optical medium 106 could be connected to an ejection seat, such that if the seat is ejected optical medium 106 is altered. Thus, if a plane is shot down in combat, the protected component(s) of the plane are tamper resistant.

Figure 4:
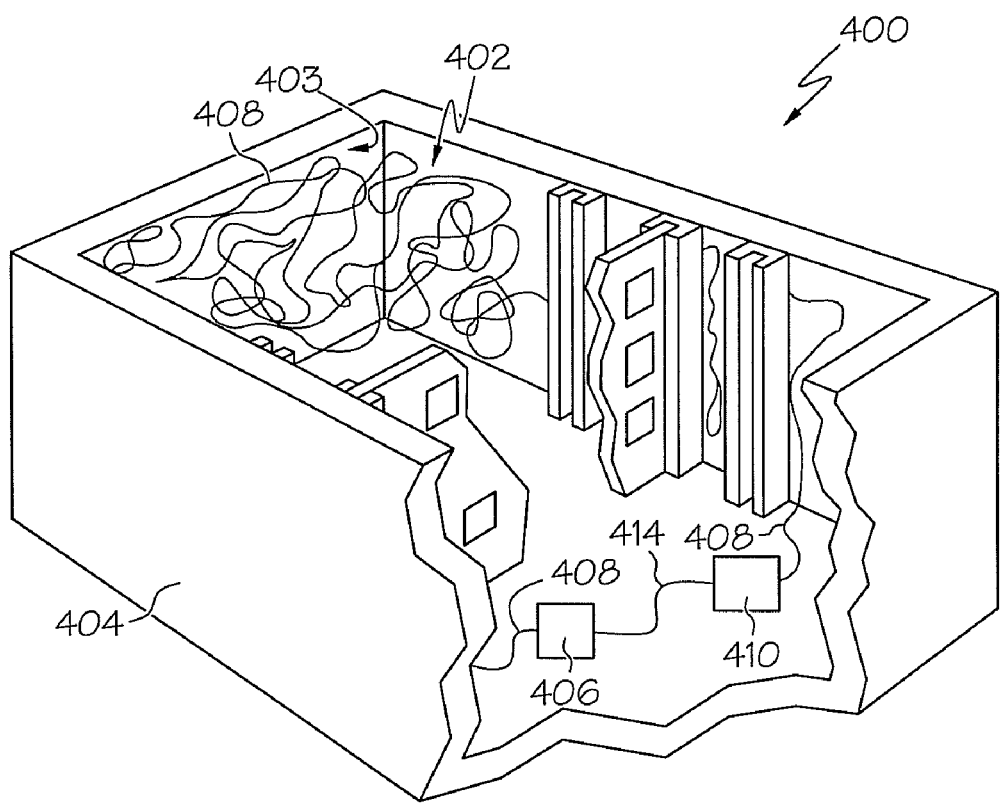
FIG. 4 is a perspective view of another embodiment of a system for recognizing tamper events.

FIG. 4 shows another embodiment of a system 400 to recognize tamper events. In FIG. 4 an optical medium 402 is disposed about an inner surface 403 of a capsule 404. In this embodiment, optical medium 402 is fixed to capsule 402 by positioning optical medium 402 on capsule 404 and coating optical medium 402 with an epoxy substance. Alternatively, optical medium 402 could be fixed by any means known to those skilled in the art, as long as optical medium 402 will not change shape during normal operation. Optical medium 402 is coupled to opto-electrical component 406 via wire 408. The other end of optical medium 402 is coupled to a light emitter 410 via wire 412. Opto-electrical component 406 sends signals to light emitter 410 via wire 414.

FIG. 4A shows one embodiment of a portion of optical medium 402 on the inner surface 406 of capsule 404. In this embodiment, optical medium 402 is a mesh consisting of a single optical fiber 408. In another embodiment, capsule 404 has multiple optical fibers 408 covering individual areas, or overlapping one another. To give optical fiber 408 a unique characterization, optical fiber 408 is cut to a certain length and bent in various places. In another embodiment, additional disturbances are added to optical fiber 408 such as, crimping, cutting, splicing, additional bending, or varying the number and pattern of any of these.

Figure 5:
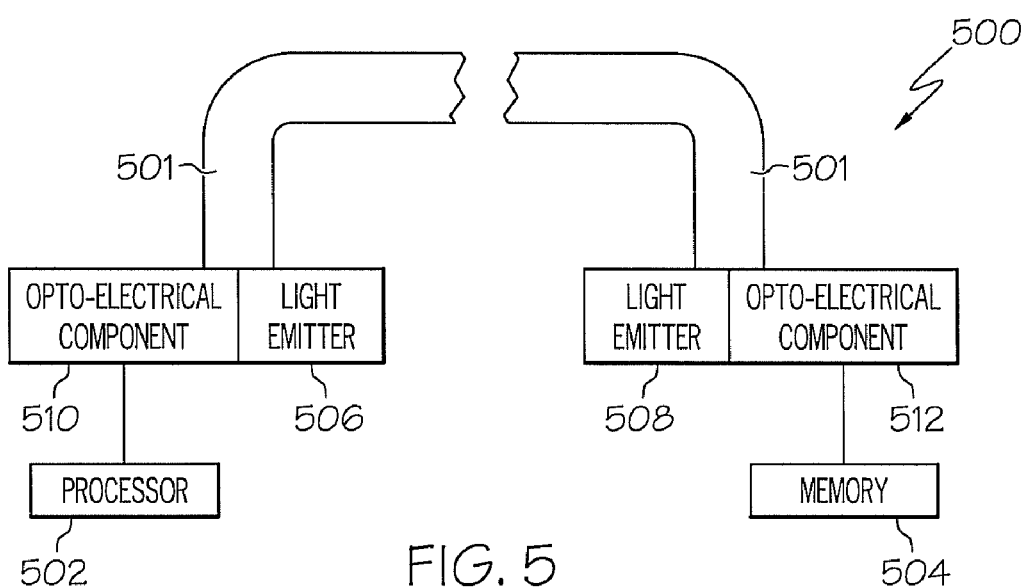
FIG. 5 is a schematic view of yet another embodiment of a system for recognizing tamper events.

FIG. 5 shows another embodiment of an optical medium 501 in a system 500. In this embodiment, optical medium 501 conditions access to system components by being used to communicate between two components of system 500, such as processor 502 and memory 504. Processor and memory 504 must communicate in both directions. Thus, system 500 has a first light emitter 506 and a second light emitter 508 coupled to each end of optical medium 501. Likewise, system 500 has a first opto-electrical component 510 and a second opto-electrical component 512 coupled to each end of optical medium 501. In this embodiment, opto-electrical components 510, 512 interface optical medium 501 to processor 502 and memory 504 respectively.

Similar to that shown in FIG. 1 or 4 optical medium 501 is disposed around a protected component. Processor 502 and memory 504 are configured to transmit and receive their operational signals through optical medium 501. If optical medium 501 is altered, the functions between processor 502 and memory 504 will likewise be altered. Thus, if system 500 is tampered with, communication between processor 502 and memory 504 will be abnormal and system 500 will not function correctly, or will function in an altered state. In this embodiment, memory 504 transmits data back to processor 502, but processor 502 needs a key from optical medium 501 to descramble the data. Alternatively, optical medium 501 could be connected between any components of system 500 that would desirably not function after access to system 500.

Figure 6:
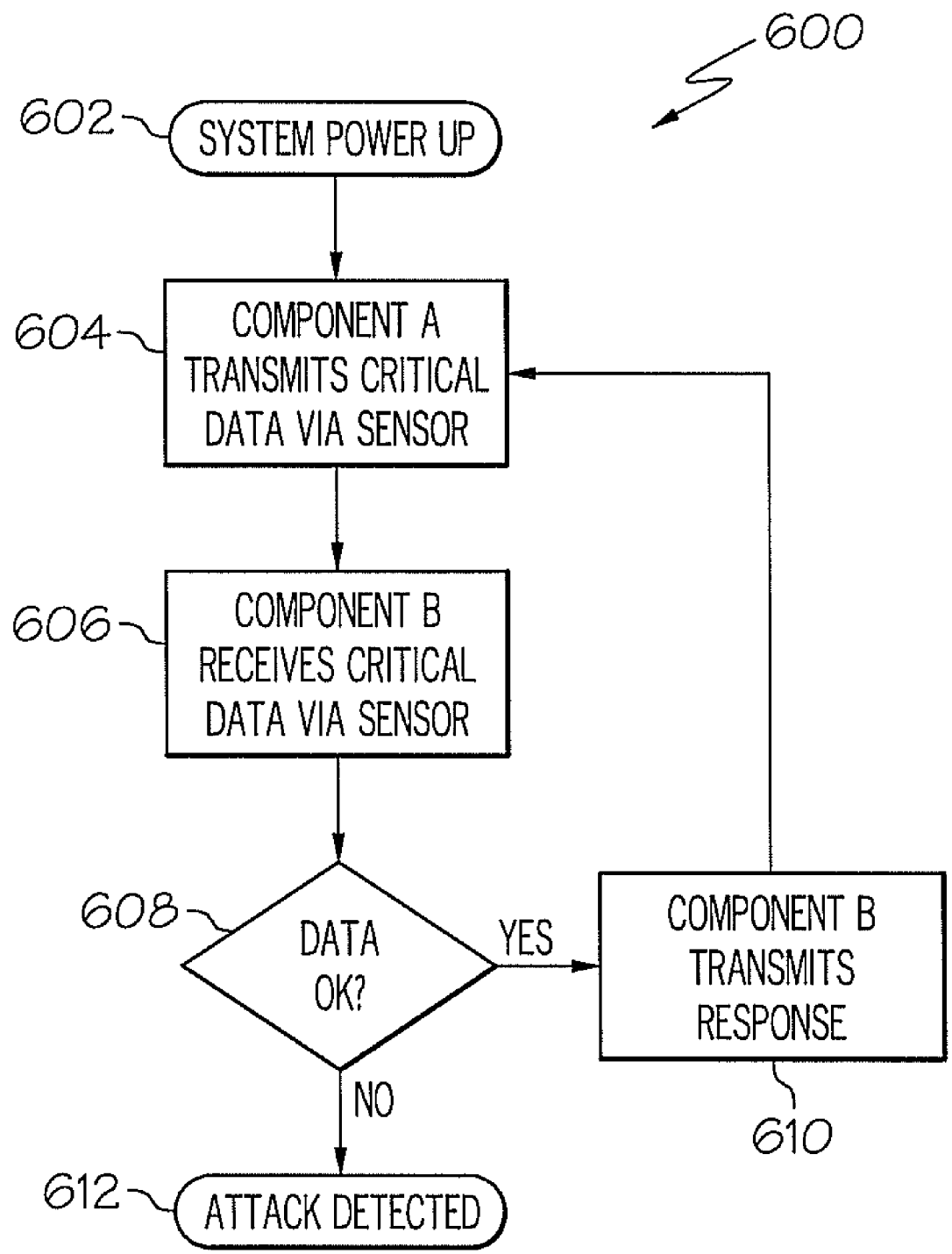
FIG. 6 is a flow diagram of one embodiment of a method of recognizing tamper events using the system of FIG. 5.

FIG. 6 illustrates one embodiment of another method of recognizing a tamper event using the embodiment shown in FIG. 5. First, system 500 is powered Up. System 500 is allowed to initialize normally without dependence upon optical medium 501. When system 500 is used, however, any tampering will be recognized. Upon use of system 500, processor 502 attempts to communicate over optical medium 501 to memory 504. Memory 504 receives the signal from processor 502 after transformation by optical medium 501. If optical medium 501 is unaltered, memory 504 receives valid data and transmits a response to processor 502 stating that valid data has been received. In this scenario, memory 504 and processor 502 can operate normally, since all communications between them are received in expected form. If, however, optical medium 510 has been altered, the data received by memory 504 will be invalid. Thus, memory 504 will not function correctly, because memory 504 has received invalid data.

Figure 7:
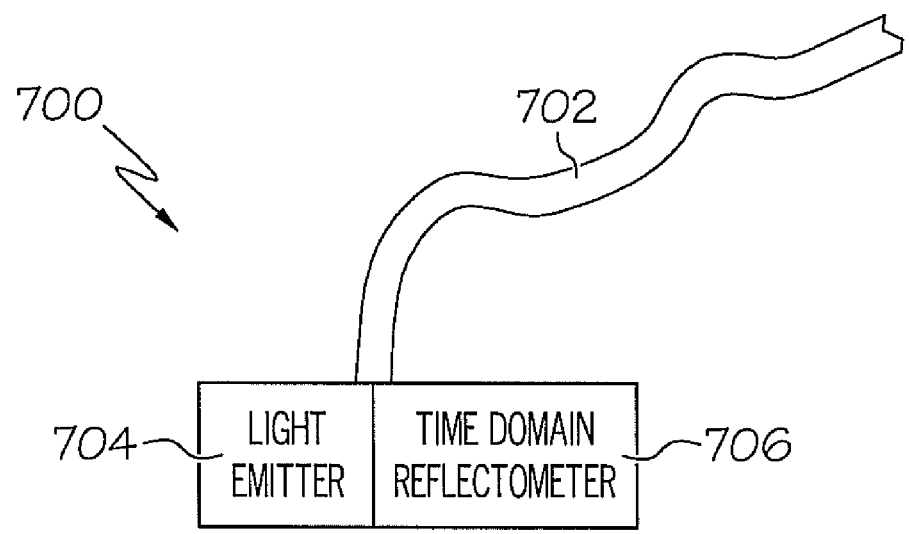
FIG. 7 is a schematic view of still another embodiment of a system for recognizing tamper events.

FIG. 7 shows a schematic view of another embodiment of a system to recognize a tamper event. System 700 includes optical medium 702, a light emitter 704, and a time domain reflectometer 706. Time domain reflectometer 706 is used to characterize optical medium 702. In this embodiment, optical medium 702 is an optical fiber and light emitter 704 is coupled to the same end of optical medium 702 as time domain reflectometer 706. Time domain reflectometer 706 measures the reflections of a signal sent through an optical fiber. A light signal is transmitted into one end of optical fiber by light emitter 704. A reflection from the optical fiber is received at the same end of optical fiber by time domain reflectometer 706. The reflection is received as a spectrum representing the bends of the optical fiber. Thus, the optical fiber is characterized by the spectrum received.

Figure 8:
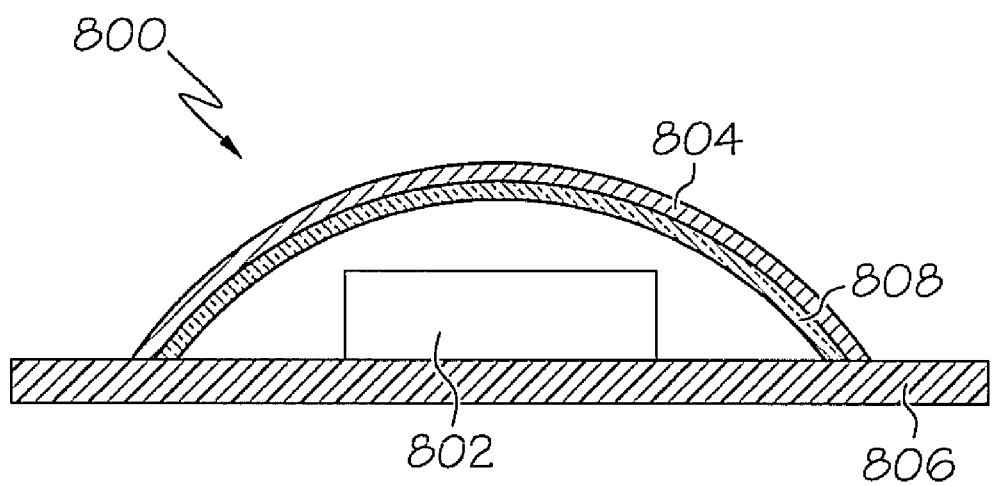
FIG. 8 is a cross-sectional view of yet another embodiment of a system for recognizing tamper events.

In another embodiment shown in FIG. 8, a protected component 802 is an electronic chip that is mounted to a circuit board 806. A capsule 804 covers protected component 802 and attaches to circuit board 806 outward of the edges of protected component 802. In this embodiment, an opto-electrical component (not shown) and an access system (not shown) are also contained within capsule 804. An optical medium 808 is disposed about the underside of capsule 804. In another embodiment, optical medium 808 is disposed about the outside of capsule 804, but the ends of the light path of optical medium 808 start and finish within capsule 804. In yet another embodiment, there is no capsule 804, and optical medium 808 alone forms the protective barrier over protected component 802. In the embodiment shown in FIG. 8, protected component 802 is inaccessible even though optical medium 808 does not fully surround protected component 802, because system 800 is configured such that access from the underside of circuit board 806 will damage system 800.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method comprising:
   transmitting a first light wave into a first optical medium, the first optical medium having a first unique signature;
   after transmitting the first light wave into the first optical medium, measuring at least one property of the first light wave, wherein the first light wave was altered by the first unique signature;
   transmitting a second light wave into a second optical medium, the second optical medium having a second unique signature;
   after transmitting the second light wave into the second optical medium, measuring at least one property of the second light wave, wherein the second light wave was altered by the second unique signature; and
   conditioning access to at least a portion of a system based on a differential between the at least one property of the first light wave and the at least one property of the second light wave.

2. The method of claim 1, wherein conditioning access further comprises:
   allowing access only if the differential between the at least one property of the first light wave and the at least one property of the second light wave is unchanged.

3. The method of claim 1, further comprising:
   receiving the first light wave at one end of the first optical medium, wherein measuring the at least one property of the first light wave comprises measuring a property of the first light wave received.

4. The method of claim 1, further comprising:
   receiving the first light wave at an end of the first optical medium which is opposite of an end in which the first light wave was transmitted.

5. The method of claim 1, further comprising:
   receiving at least one reflection of the transmitted first light wave or second light wave at a same end of the first or second optical medium, respectively, in which the first light wave or second light wave was transmitted.

6. The method of claim 1, wherein conditioning access further comprises:
   generating an encryption key from the differential between the at least one property of the first light wave and the at least one property of the second light wave.

7. The method of claim 6, wherein conditioning access further comprises:
   decrypting stored data with the encryption key.

8. An apparatus comprising:
   an optical medium configured to have a unique signature, wherein the unique signature is configured to alter a property of a light wave traveling through the optical medium;
   a light emitter in optical communication with the optical medium;
   an opto-electrical component coupled to the optical medium and operable to measure at least one property of a light wave that has traveled in the optical medium;
   wherein the apparatus is configured to determine whether the at least one property of the light wave that has traveled in the optical medium has been altered; and
   an access system operable to condition access to at least a portion of the apparatus based on the at least one property of the light wave that has traveled in the optical medium.

9. The apparatus of claim 8, wherein the access system is unique and is configured to generate a generic key from the at least one property of the light wave that traveled in the optical medium.

10. The apparatus of claim 8, wherein the optical medium comprises one or more optical fibers.

11. The apparatus of claim 8, wherein the optical medium is fixed permanently in place.

12. The apparatus of claim 8, further comprising:
    protected electronics; and
    a capsule covering the protected electronics, wherein the optical medium is disposed about the capsule.

13. The apparatus of claim 12, wherein the capsule also covers the opto-electrical component and the access system.

14. A method comprising:
    measuring at least one value relating to a first optical property of a first optical fiber;
    measuring at least one value relating to a second optical property of a second optical fiber;
    calculating a differential between the at least one value relating to the first optical property and the at least one value relating to the second optical property; and
    conditioning access to a system based on the differential.

15. The method of claim 14, further comprising:
    generating a key from the differential.

16. The method of claim 14, further comprising:
    forming the first optical fiber to have a first unique signature; and
    forming the second optical fiber to have a second unique signature.

17. The method of claim 16, wherein forming the first optical fiber to have a unique signature comprises bending the first optical fiber.

18. The method of claim 16, wherein forming the first optical fiber to have a unique signature comprises cutting the first optical fiber.

19. The method of claim 16, wherein forming the first optical fiber to have a unique signature comprises imbedding at least one material in the first optical fiber.

* * * * *